(12) United States Patent
Chen

(10) Patent No.: US 12,139,044 B2
(45) Date of Patent: Nov. 12, 2024

(54) FLYBACK ELECTRIC CHARGE REGENERATIVE BRAKE SYSTEM

(71) Applicant: Tauyuan Chen, Taipei (TW)

(72) Inventor: Tauyuan Chen, Taipei (TW)

( * ) Notice: Subject to any disclaimer, the term of this patent is extended or adjusted under 35 U.S.C. 154(b) by 196 days.

(21) Appl. No.: 17/950,079

(22) Filed: Sep. 21, 2022

(65) Prior Publication Data

US 2024/0092180 A1    Mar. 21, 2024

(51) Int. Cl.
*B60L 7/10*    (2006.01)
*H02P 3/14*    (2006.01)

(52) U.S. Cl.
CPC . *B60L 7/10* (2013.01); *H02P 3/14* (2013.01)

(58) Field of Classification Search
CPC ...... H02P 3/14; H02P 3/12; H02P 1/24; H02P 1/26; H02P 1/42; H02P 1/46; H02P 9/08; H02P 25/062; H02P 25/064; H02P 27/06; H02P 2207/05; H02P 2207/07; B60L 7/10; B60L 7/12; B60L 7/14; B60L 7/26; B60L 7/20; B60L 7/22

USPC ........................................................... 318/376
See application file for complete search history.

(56) References Cited

U.S. PATENT DOCUMENTS 9,553,463 B2 *    1/2017    Botts ..................... H02J 7/0024

\* cited by examiner

*Primary Examiner* — Antony M Paul

(57) ABSTRACT

A flyback electric charge regenerative brake system, including a transmission shaft connected to and can be drive by the recycled kinetic energy, several pieces of rotating discs and fixed plates are stacked staggered and strung by the transmission shaft perpendicularly; on the plane of all rotating discs, staggered arrangement several pieces of the conductive films that can be charged with positive and negative charges. On the plane of all fixed plates, arrangement several pieces of neutral conductive films been paired and connected by a transformer; when the transmission shaft rotates the rotating discs via the recycled kinetic energy, the positive conductive films and the negative conductive films on the plan of the rotating discs will passing above each pair of the neutral conductive films on the plan of the fixed plates.

3 Claims, 6 Drawing Sheets

FLYBACK ELECTRIC CHARGE REGENERATIVE BRAKE SYSTEM

TECHNICAL FIELD

The invention relates to a regenerative brake system and more particularly by using the recycled energy to change the positive and negative electric field above the paired neutral conductive films.

BACKGROUND ART

There is known the regenerative brake system is limited to a few functions: for example, the device transfers the recovered kinetic energy from the braking system to rotate the coil and iron core inside the electric motor that originally is the vehicle's power output, it causes the electromagnetic induction to generates the reverse current for recovery energy and store into the battery.

Because the coil and iron core inside the electric motor have a certain mass, the rotate inertia will cause the reaction force when rotate it, when the recovered kinetic energy rotates the coil and iron core inside the electric motor, the coil and iron core reaction force will affect to the braking stability and ability.

In addition, when the coil and iron core inside the electric motor are rotating at the low speed, the attenuated electromotive force product less recovered kinetic energy for collect, it limited the recovered kinetic energy only be collectable when the coil and iron core inside the electric motor are rotating at the high-speed.

To enhance the recovered kinetic energy performance, it requests an external transmission gearbox to speed up the coil and iron core when vehicle at low speed for collect more recovered kinetic energy and engage to an independently electric generator to reduced the reaction force to affect to the braking stability and ability, therefore it increase the overall vehicle's weight and cost more energy consumption.

Another regenerative brake system, in order to transfer the vehicle's recovered kinetic energy to the flywheel through the transmission gearbox.

This flywheel storage the recovered kinetic energy by uses moment of inertia when the vehicle enables the break, because the stored rotational energy is proportional to the product of its moment of inertia and the square of its rotational speed, this will limit the recovery energy only be collectable when the vehicle enable the break at high-speed mode, because the flywheel has a certain mass, when the recovered kinetic energy rotates the flywheel, the flywheel's reaction force will affect to the braking stability and ability.

In addition, the flywheel's mass will increase the vehicle's weight and effect to the engine output then increase the energy consumption.

However, such known regenerative brake systems have a certain mass, which increases the vehicle's weight and affects the engine output. It causes more energy consumption and less kinetic energy recovery efficiency.

SUMMARY OF THE INVENTION

An object of the invention is to provide a regenerative brake system with lightweight and quickly breaking response, also can collect the recovery kinetic energy more efficiently no matter when a vehicle is driving in high-speed or low-speed situation.

In accordance with the invention, there is provided a Flyback electric charge regenerative brake system comprising:

A transmission shaft connect to and can be driven by the recycled kinetic energy, several pieces of the rotating discs and the fixed plates are stacked staggered and located in the shell. The transmission shaft string into the center of all of the rotating discs and the fixed plates perpendicularly.

Every rotating disk contains two round insulate plates and several pieces of the positive conductive films and the negative conductive films were staggered arrangement around the center of the rotating discs stacked between the two round insulate plates, every positive conductive film and negative conductive film will link to the voltage regulator for adjust the voltage.

Every fixed plate contains two insulate plates and several pieces of the first neutral conductive films and the second neutral conductive films, all of the first neutral conductive films and the second neutral conductive films were staggered arrangement around the center of the fixed plate plan and stacked between the two insulating plates, each adjacent of the first neutral conductive film and the second neutral conductive film on the plan of every fixed plate will be paired, each paired of the first neutral conductive film and the second neutral conductive film will link to the individual transformer.

The rotating discs will be rotate by the transmission shaft, the center of every fixed plate is separate to the transmission shaft.

By using the voltage regulator to charge all of the positive conductive films and the negative conductive films on every rotating disc, the area above all of the surfaces of the positive conductive films will be generated the positive elect field and the area above all of the surfaces of the negative conductive films will be generated the negative elect field.

When all of the rotating discs rotated by the transmission shaft, all of the charged positive conductive films and the charged negative conductive films that on every rotating disc will passing above each pair of the first neutral conductive film and the second neutral conductive film that on every fixed plate, it will form the positive electric fields and the negative electric fields on the surface of the first neutral conductive films and the second neutral conductive films at the overlapping area, the formed positive electric fields and the negative electric fields will generate the attraction force at the overlapping area then cause all of the fixed plates form the braking effect to all of the rotating discs.

When the recycled energy continue to drive the transmission shaft and rotates the rotating discs, all of the positive conductive films and the negative conductive films that on every rotating disc will pass above all of the first neutral conductive films and the second neutral conductive films that on the plan of every fixed plate continuously, the polarity of the electric field above all of the first neutral conductive films and the second neutral conductive films will be change repeatedly.

The positive charges and negative charges that distribute on the surface of all of the first neutral conductive films and the second neutral conductive films will be push or attract by the changing electric field repeatedly, when each adjacent of the first neutral conductive films and the second neutral conductive films been paired and connected by the individual transformer's primary side the positive charges and negative charges will be direct and passing through the primary side of the transformer, then at the transformer's secondary side will generate electrical energy for collect.

As mentioned above, according to the present invention, the component of the rotating disk contains less mass, it can reduce the reaction force when the vehicle is at driving status. The positive conductive films and the negative conductive films that on the rotating discs are voltage adjustable, it is easily to control the attraction force and adjust the braking response quickly.

These and other concomitant advantages of the present invention will become more apparent from the description of the appended claims.

BRIEF DESCRIPTION OF THE DRAWINGS

The present invention will be described in detail with reference to the accompanying drawings.

DETAILED DESCRIPTION OF PREFERRED EMBODIMENT

An embodiment of the present invention relates to the flyback electric charge regenerative brake system 1 comprising: a transmission shaft 6 connected to and can be drive by the recycled kinetic energy, several pieces of rotating discs 2 and fixed plates 4 are stacked staggered and strung by the transmission shaft 6 perpendicularly.

Figure 1:
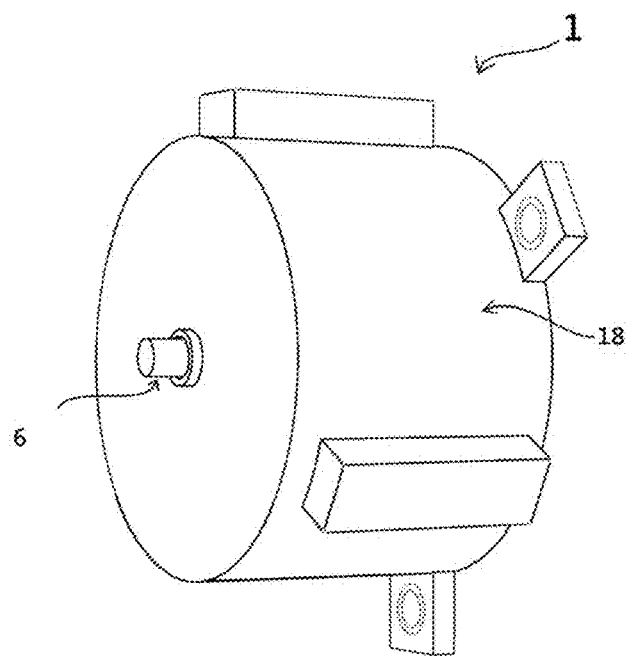
FIG. 1 illustrates a schematic perspective view of the Flyback electric charge regenerative brake system according to the invention.
Figure 2:
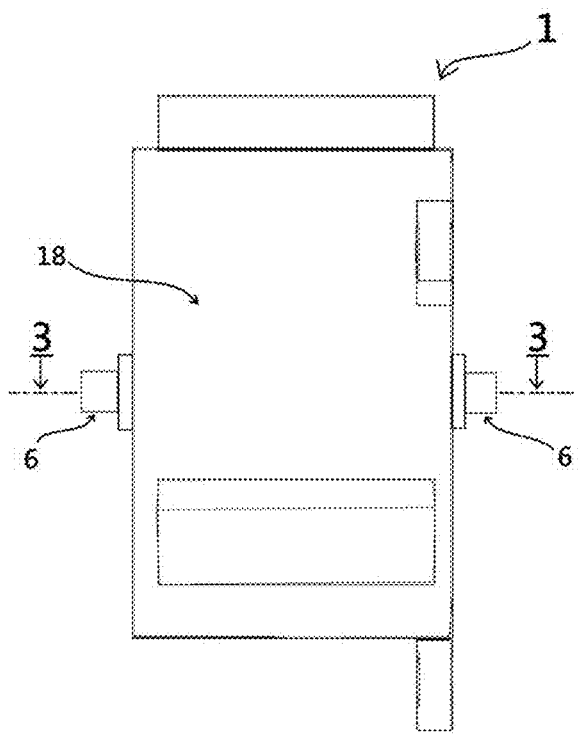
FIG. 2 illustrates a schematic side elevation view of the Flyback electric charge regenerative brake system according to the invention.
Figure 3:
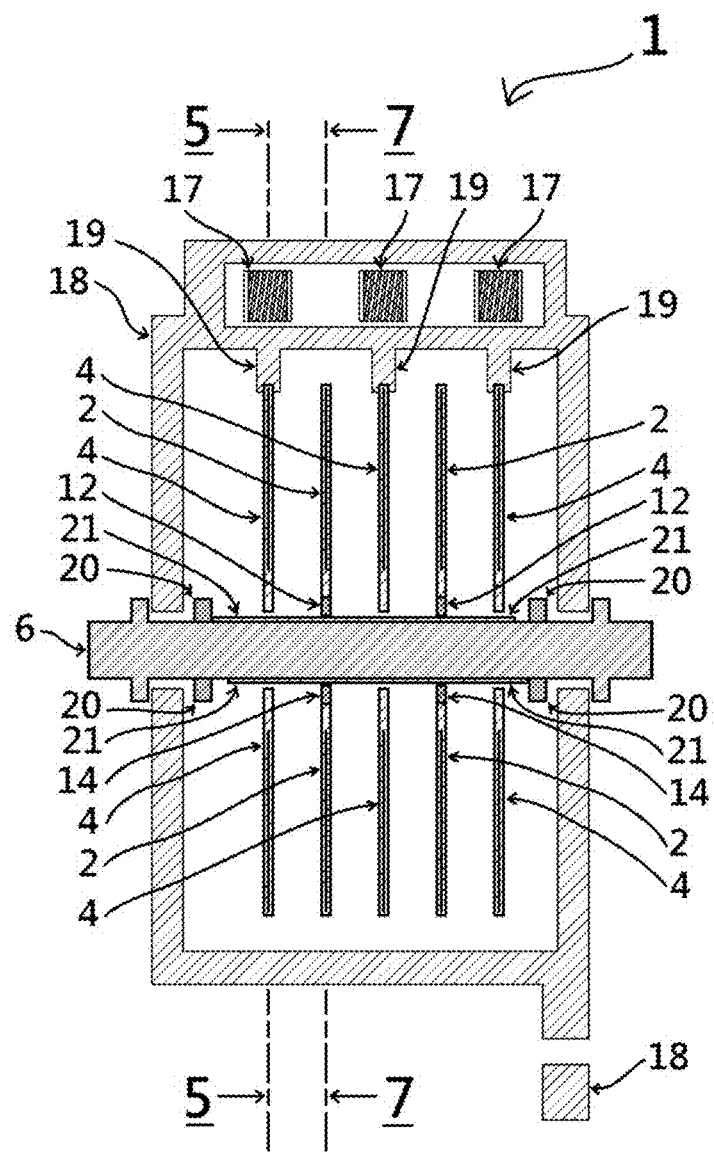
FIG. 3 illustrates a schematic side cross-sectional view of the Flyback electric charge regenerative brake system according to the invention.
Figure 8:
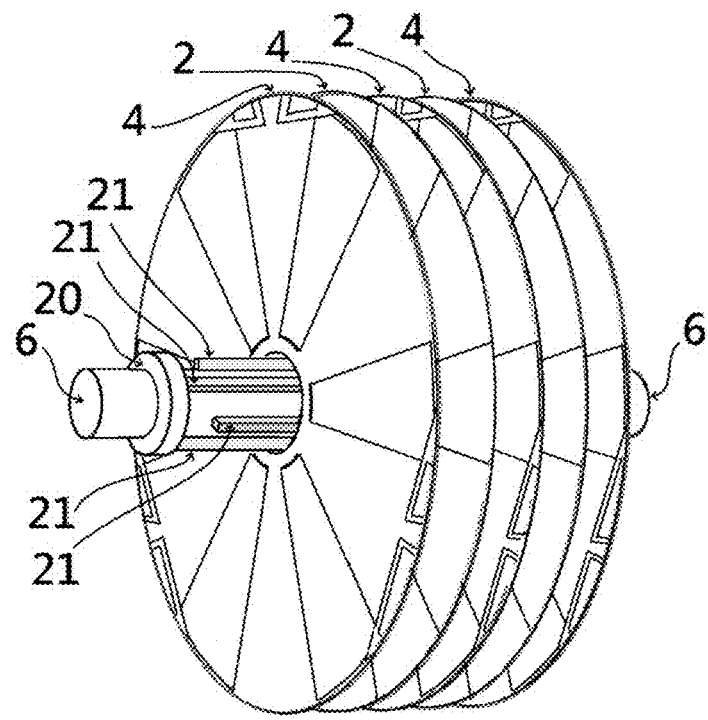
FIG. 8 illustrates a schematic perspective view of the assembly method about the transmission shaft, rotating discs and fixed plates inside the Flyback electric charge regenerative brake system according to the invention.
Figure 9:
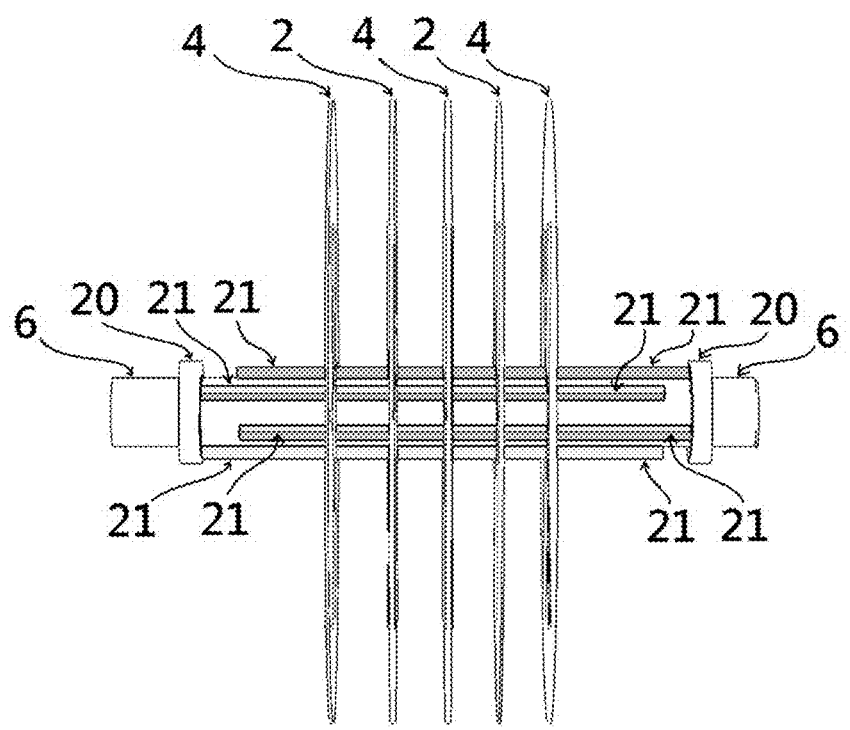
FIG. 9 illustrates a schematic side elevation view of the assembly method about the transmission shaft, rotating discs and fixed plates inside the Flyback electric charge regenerative brake system according to the invention.

Referring to FIG. 1, FIG. 2, FIG. 3, FIG. 8 and FIG. 9, generally, according to the present invention, a transmission shaft 6 connect to and can be rotate by the recycled kinetic energy, several parallel charge wires 21 laying on the surface of the transmission shaft 6 and aligning with the axis of the transmission shaft 6, at the end of these charge wires 21 are connect to the voltage regulator 20.

Several pieces of the rotating discs 2 and the fixed plates 4 are stacked staggered and located inside of the shell 18. The transmission shaft 6 string into the center of all of the rotating discs 2 and the fixed plates 4 perpendicularly. Every rotating disk 2 will fixed on the transmission shaft 6 and can be rotate by the transmission shaft 6. Every fixed plate 4 is fixed on the pedestal 19 inside of the shell 18, and the center of every fixed plate 4 is separate to the transmission shaft 6. Between every rotating disc 2 and fixed plate 4 is separated by a small gap to keep them insulated.

Figure 6:
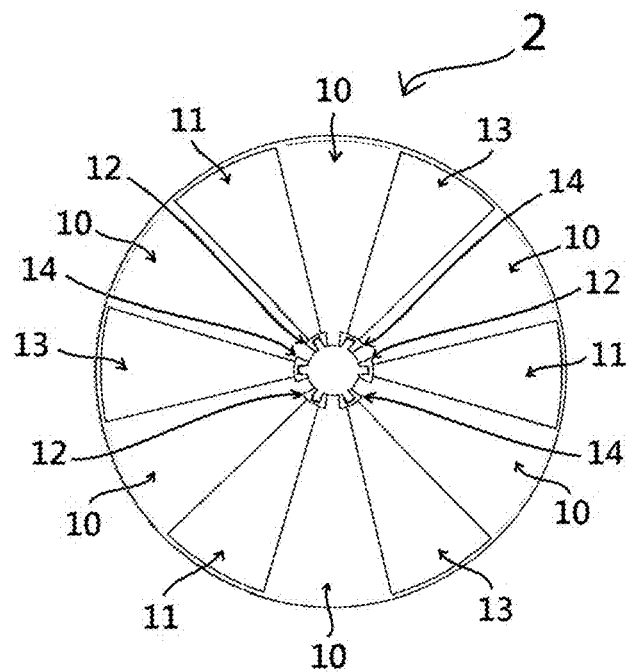
FIG. 6 illustrates a schematic top view of one of the rotating disc was a component inside the Flyback electric charge regenerative brake system according to the invention.
Figure 7:
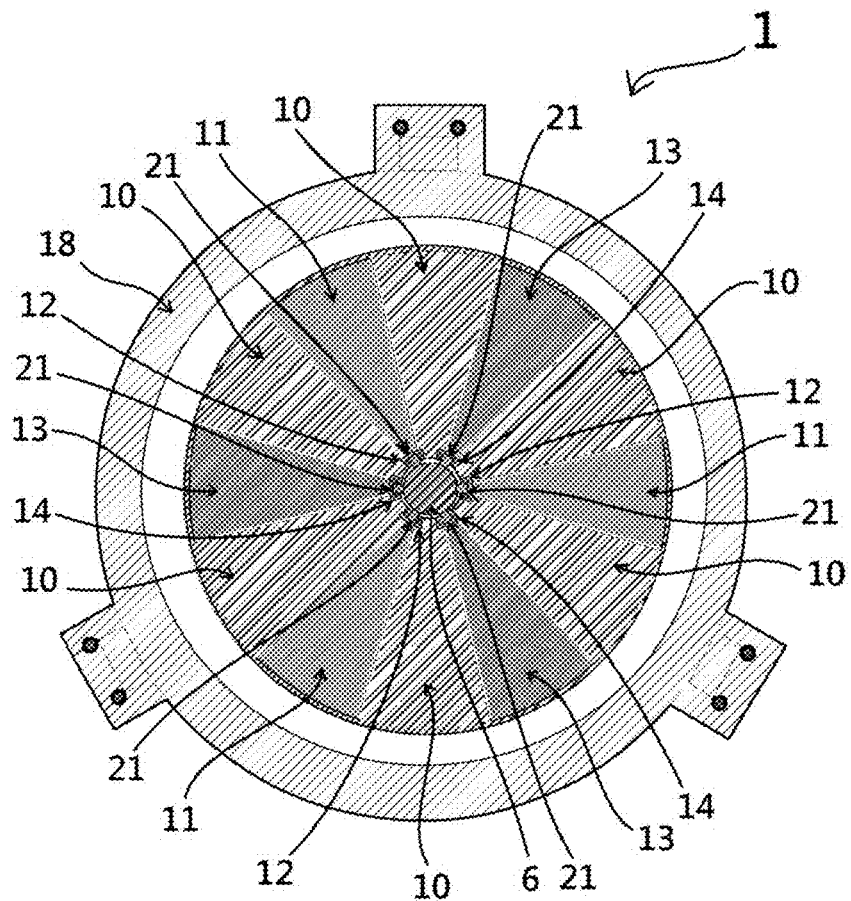
FIG. 7 illustrates a schematic cross-sectional view at one of the rotating disc side position was inside the Flyback electric charge regenerative brake system according to the invention.

Referring to FIG. 3, FIG. 6, FIG. 7, FIG. 8 and FIG. 9, generally, according to the present invention. Every rotating disk 2 contains two round insulate plates and several pieces of the positive conductive films 11 and the negative conductive films 13, all of the positive conductive films 11 and the negative conductive films 13 on every rotating disk 2 are cut with sector shape, and following the rotate direction, all of the positive conductive films 11 and the negative conductive films 13 on every rotating disk 2 were separated by the isolate sector 10 and staggered arrangements around the center of the rotating disk's 2 plan and stacked between the two round insulate plates, every positive conductive film 11 and negative conductive film 13 will link to their own positive electrode 12 and negative electrode 14 at the center of the rotating disk 2.

When the transmission shaft 6 inserts into the center of all of the rotating disks 2, every positive electrodes 12 and negative electrodes 14 at the center of all of the rotating disks 2 will connect to the charge wires 21 that was laid on the surface of the transmission shaft 6.

Figure 4:
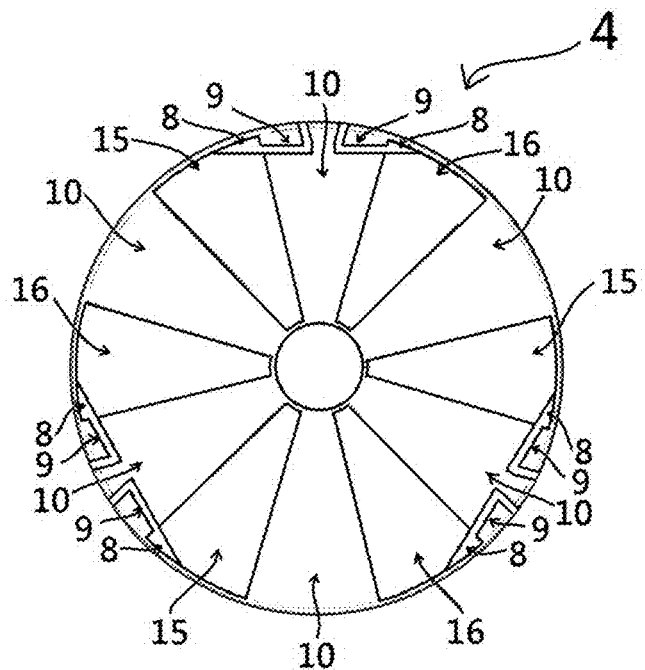
FIG. 4 illustrates a schematic top view of one of the fixed plate was a component inside the Flyback electric charge regenerative brake system according to the invention.
Figure 5:
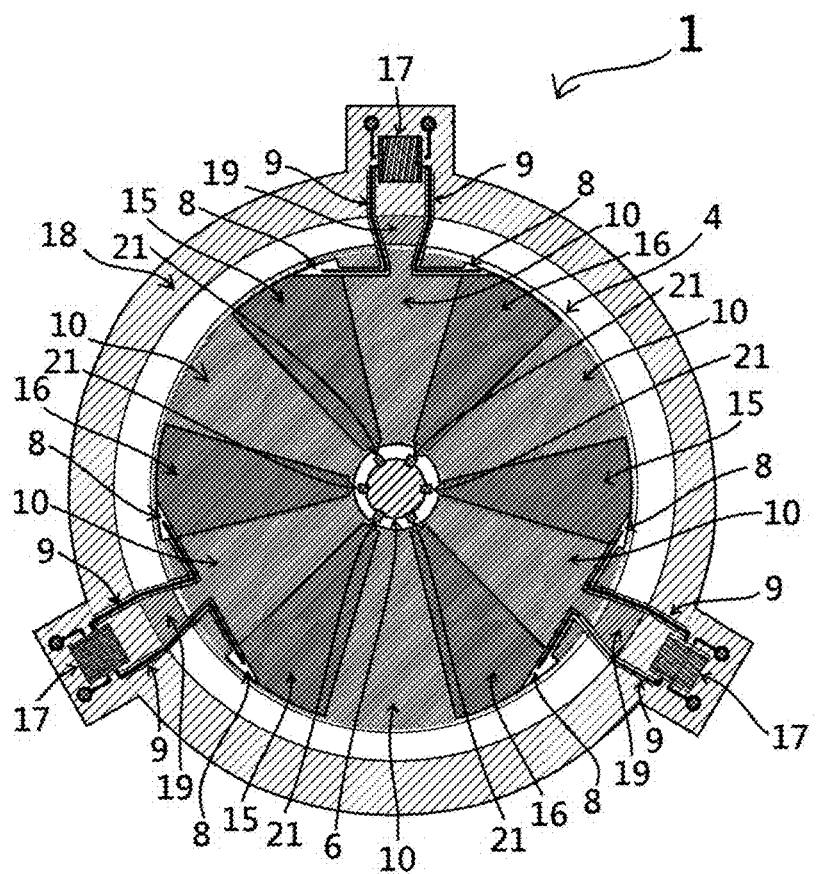
FIG. 5 illustrates a schematic cross-sectional view at one of the fixed plate side position was inside the Flyback electric charge regenerative brake system according to the invention.

Referring to FIG. 3, FIG. 4, FIG. 5, FIG. 8 and FIG. 9, generally, according to the present invention. Every fixed plate 4 contains two insulate plates and several pieces of the first neutral conductive films 15 and the second neutral conductive films 16, all of the first neutral conductive films 15 and the second neutral conductive films 16 on every fixed plate 4 are cut with sector shape, and when follow the rotate direction, all of the first neutral conductive films 15 and the second neutral conductive films 16 on every fixed plate 4 were separated by the isolate sector 10 and staggered arrangement around the center of the fixed plate 4 plan and stacked between the two insulating plates, each adjacent of the first neutral conductive film 15 and the second neutral conductive film 16 on the plan of every fixed plate 4 will be paired, and every paired of the first neutral conductive film 15 and the second neutral conductive film 16 will connect to the individual transformer's 17 primary side through the output electrodes 8 and the output wires 9. Every transformer 17 was fixed on outside of the shell 18 and every transformer's 17 secondary side will connect to the battery to collect the recycled kinetic energy.

Figure 10:
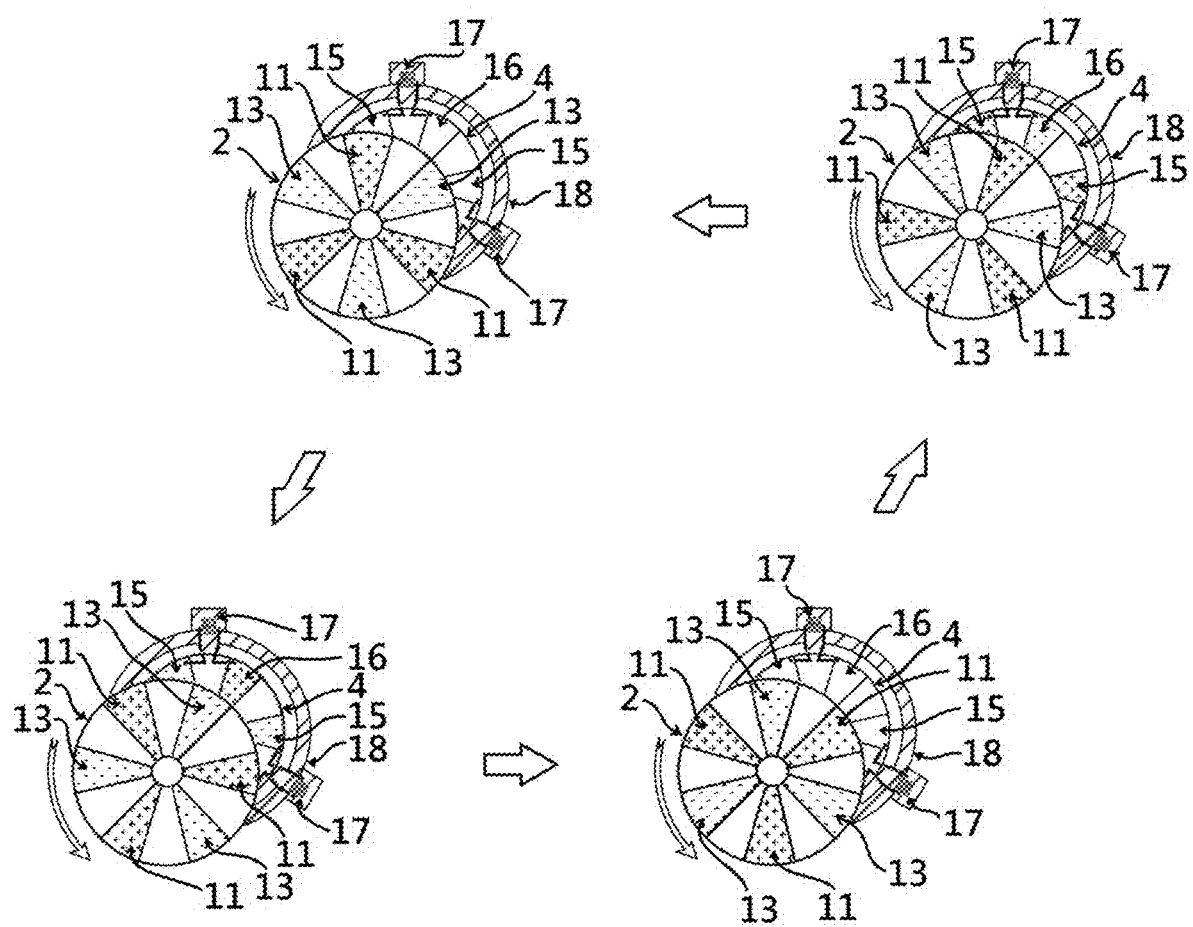
FIG. 10 illustrates a schematic when rotate the rotating disc the positive charges and the negative charges distribution status on the first neutral conductive films and the second neutral conductive films that inside the Flyback electric charge regenerative brake system according to the invention

Referring to FIG. 1, FIG. 2, FIG. 3, FIG. 8, FIG. 9, and FIG. 10, generally, according to the present invention, the optimal flyback electric charge regenerative brake system 1 first object is to generate the braking force, By using the voltage regulator 20 to charge all of the positive conductive films 11 and the negative conductive films 13 on every rotating disc 2, the area above all of the surfaces of the positive conductive films 11 will be generated the positive elect field and the area above all of the surfaces of the negative conductive films 13 will be generated the negative elect field.

When all of the rotating discs 2 rotated by the transmission shaft 6, all of the charged positive conductive films 11 and the charged negative conductive films 13 that on every rotating disc 2 will passing above each pair of the first neutral conductive film 15 and the second neutral conductive film 16 that on every fixed plate 4, it will form the positive electric fields and the negative electric fields on the surface of the first neutral conductive films 15 and the second neutral conductive films 16 at the overlapping area, the formed positive electric fields and the negative electric fields will generate the attraction force at the overlapping area then cause all of the fixed plates 4 form the braking force to all of the rotating discs 2.

The attraction force is proportional to the voltages of the positive conductive films 11 and the negative conductive films 13 on every rotating disc 2, and inversely proportional to the squared vertical distance between the conductive films surface that on the rotating discs 2 and on the fixed plates 4. By using the voltage regulator 20 to adjust the voltage of all of the positive conductive films 11 and the negative conductive films 13 is able to control the braking force.

Referring to FIG. 1, FIG. 2, FIG. 3, FIG. 8, FIG. 9, and FIG. 10, generally, according to the present invention, the optimal flyback electric charge regenerative brake system 1 another object is to collect the recycled kinetic energy.

When the recycled kinetic energy continue to drive the transmission shaft 6 and rotates the rotating discs 2, all of the positive conductive films 11 and the negative conductive films 13 that on every rotating disc 2 will pass above all of the first neutral conductive films 15 and the second neutral conductive films 16 that on the plan of every fixed plate 4 continuously, the polarity of the electric field above all of the first neutral conductive films 15 and the second neutral conductive films 16 will be change repeatedly.

The positive charges and negative charges that distribute on the surface on each paired of the first neutral conductive films 15 and the second neutral conductive films 17 will be push or attract by the changing electric field repeatedly, the positive charges and the negative charges will be direct and passing through the primary side of the transformer 17 repeatedly, then at the transformer's 17 secondary side will generate electrical energy for collect.

LIST OF REFERENCE NUMERALS 1 flyback electric charge regenerative brake system
2 rotating disc
4 fixed plate
6 transmission shaft
8 output electrode
9 output wire
10 isolate sector
11 positive conductive film
12 positive electrode
13 negative conductive film
14 negative electrode
15 the first neutral conductive film
16 the second neutral conductive film
17 transformer
18 shell
19 pedestal
20 voltage regulator
21 charge wire

The invention claimed is:
1. An embodiment of the present invention relates to the flyback electric charge regenerative brake system (1) comprising:

A transmission shaft (6) connected to and can be drive by the recycled kinetic energy, several pieces of rotating discs (2) and fixed plates (4) are stacked staggered located in the shell (18) and strung by the transmission shaft (6) perpendicularly;

Several parallel charge wires (21) laying on the surface of the transmission shaft (6) and aligning with the axis of the transmission shaft (6), at the end of these charge wires (21) are connect to the voltage regulator (20);

Several pieces of the rotating discs (2) and the fixed plates (4) are stacked staggered and located inside of the shell (18); The transmission shaft (6) string into the center of all of the rotating discs (2) and the fixed plates (4) perpendicularly; Every rotating disk (2) is fixed on the transmission shaft (6) and can be rotate by the transmission shaft (6); Every fixed plate (4) is fixed on the pedestal (19) inside of the shell (18), and the center of every fixed plate (4) is separate to the transmission shaft (6); Between every rotating disc (2) and fixed plate (4) is separated by a small gap to keep them insulated;

Every rotating disk (2) contains two round insulate plates and several pieces of the positive conductive films (11) and the negative conductive films (13), all of the positive conductive films (11) and the negative conductive films (13) on every rotating disk (2) are cut with sector shape; Following the rotate direction, all of the positive conductive films (11) and the negative conductive films (13) on every rotating disk (2) were separated by the isolate sector (10) and staggered arrangements around the center of the rotating disk's (2) plan and stacked between the two round insulate plates; Every positive conductive film (11) and negative conductive film (13) will link to their own positive electrode (12) and negative electrode (14) at the center of the rotating disk (2);

When the transmission shaft (6) inserts into the center of all of the rotating disks (2), every positive electrodes (12) and negative electrodes (14) at the center of all of the rotating disks (2) will connect to the charge wires (21) that was laid on the surface of the transmission shaft (6);

Every fixed plate (4) contains two insulate plates and several pieces of the first neutral conductive films (15) and the second neutral conductive films (16), all of the first neutral conductive films (15) and the second neutral conductive films (16) on every fixed plate (4) are cut with sector shape; Follow the rotate direction, all of the first neutral conductive films (15) and the second neutral conductive films (16) on every fixed plate (4) were separated by the isolate sector (10) and staggered arrangement around the center of the fixed plate (4) plan and stacked between the two insulating plates, each adjacent of the first neutral conductive film (15) and the second neutral conductive film (16) on the plan of every fixed plate (4) will be paired, every paired of the first neutral conductive film (15) and the second neutral conductive film (16) will connect to the individual transformer's (17) primary side through the output electrodes (8) and the output wires (9); Every transformer (17) was fixed on outside of the shell (18) and every transformer's (17) secondary side connect to the battery to collect the recycled kinetic energy;

By using the voltage regulator (20) to charge all of the positive conductive films (11) and the negative conductive films (13) on every rotating disc (2), the area above all of the surfaces of the positive conductive films (11) will be generated the positive elect field; the area above all of the surfaces of the negative conductive films (13) will be generated the negative elect field;

Characterized in that said When all of the charged positive conductive films (11) overlap the area above each paired of the first neutral conductive film (15) on every fixed plate (4), it will form the positive electric fields on the surface of the first neutral conductive films (15) at the overlapping area, and the negative charges will move to the first neutral conductive film (15); When all of the charged negative conductive films (13) overlap the area above each paired of the second neutral conductive film (16) on every fixed plate (4), it will form the negative electric fields on the surface of the second neutral conductive films (16) at the overlapping area, and the positive charges will move to the second neutral conductive film (16);

As the rotating disk been rotated by the transmission shaft (6), cause all of the charged positive conductive films (11) move to overlap the area above each paired of the second neutral conductive film (15) on every fixed plate (4), it will form the positive electric fields on the surface of the second neutral conductive films (15) at the overlapping area, and the negative charges will move to the second neutral conductive film (15); As the rotating disk been rotated by the transmission shaft (6), cause all of the charged negative conductive films (13) move to overlap the area above each paired of the first neutral conductive film (16) on every fixed plate (4), it will form the negative electric fields on the surface of the first neutral conductive films (16) at the overlapping area, and the positive charges will move to the first neutral conductive film (16).

2. The flyback electric charge regenerative brake system (1) as claimed in claim 1 Characterized in that When all of the rotating discs (2) rotated by the transmission shaft (6), all of the charged positive conductive films (11) and the charged negative conductive films (13) that on every rotating disc (2) will passing above each pair of the first neutral conductive film (15) and the second neutral conductive film (16) on every fixed plate (4);

The formed positive electric fields and the negative electric fields will generate the attraction force at the overlapping area then cause all of the fixed plates (4) form the braking force to all of the rotating discs (2); By using the voltage regulator (20) to adjust the voltage of all of the positive conductive films (11) and the negative conductive films (13) is able to control the braking force.

3. The flyback electric charge regenerative brake system (1) as claimed in claim 1 Characterized in that When the recycled kinetic energy continue to drive the transmission shaft 6 and rotates the rotating discs 2, all of the positive conductive films (11) and the negative conductive films (13) that on every rotating disc 2 will pass above all of the first neutral conductive films (15) and the second neutral conductive films (16) that on the plan of every fixed plate (4) continuously;

The polarity of the electric field above all of the first neutral conductive films (15) and the second neutral conductive films (16) will be change repeatedly; The positive charges and negative charges that distribute on the surface on each paired of the first neutral conductive films (15) and the second neutral conductive films (17) will be push or attract by the changing electric field repeatedly, the positive charges and the negative charges will be direct and passing through the primary side of the transformer (17) repeatedly, then at the transformer's (17) secondary side will generate electrical energy for collect.

* * * * *